United States Patent Office 3,575,973
Patented Apr. 20, 1971

3,575,973
COMPOUNDS CONTAINING A DINITROFLUORO-
METHYL GROUP
Milton B. Frankel, Tarzana, Calif., assignor to
North American Rockwell Corporation
No Drawing. Filed June 27, 1966, Ser. No. 563,019
Int. Cl. C07d 55/36; C07c 79/46, 111/00
U.S. Cl. 260—248                                    1 Claim

ABSTRACT OF THE DISCLOSURE

New explosive compounds having the group $-(NO_2)_2F$ including nitramines and esters formed from the reactions respectively of $FC(NO_2)_2CH_2OH$ with (1) amines followed by nitration to obtain nitramines and (2) aromatic and heterocyclic acid chlorides to obtain esters.

This invention relates to explosive compounds containing fluorine atoms. More particularly, the invention relates to explosives containing nitrofluoro groups.

Previously, it has been shown in the art that conventional explosives containing fluorine atoms exhibit physical and explosive properties which are superior to those of the parent nonfluorinated explosives. These previous explosives were fluoronitro compounds which contained C—$NO_2$, N—$NO_2$, $CF_3$ and C—F groups.

It is an object of this invention to further increase the physical and explosive properties of fluorinated explosives. The foregoing and other objects of the invention will become apparent from the following detailed description. In order to improve the energy of the fluoronitro explosive compounds without sacrificing thermal stability, a novel concept evolved in which the nitro group and the fluorine atom were integrated upon the same carbon atom.

In order to accomplish the above, a group of new explosive compounds were derived in which the energetic yet thermally stable group, dinitrofluoromethyl, $-(NO_2)_2F$ was incorporated into the organic molecules. Thus, this invention relates to a series of nitramines and esters incorporating the dinitrofluoromethyl grouping. These compounds are thermally stable crystalline solids. They melt without decomposition and are thermally stable even in a liquid state well above their melting point. The calculated explosive power of the compounds of the invention range from 105 to 146 (TNT=100).

The nitramines and esters of this invention are formed from the reaction of 2,2 - dinitro - 2 - fluoroethanol, $FC(NO_2)_2CH_2OH$, with amines followed by nitration to obtain nitramines, while in the case of esters, the 2,2-dinitro-2-fluoroethanol is reacted with aromatic and heterocyclic acid chlorides.

NITRAMINES

The nitramine compounds of this invention are prepared by nitration of corresponding amines according to the following reaction:

$$RCH_2\underset{H}{\overset{H}{N}}-\left[(CH_2)_n-\underset{H}{\overset{H}{N}}\right]_m-CH_2R' \xrightarrow{HNO_3}$$

$$RCH_2\underset{NO_2}{\overset{NO_2}{N}}-\left[(CH_2)_n-\underset{NO_2}{\overset{NO_2}{N}}\right]_m-CH_2R'$$

where
$n = 1$ to 3
$m = 0$ to 3
$R = -C(NO_2)_2F$
$R' = -C(NO_2)_2F$, and when $m=0$ is $-CF_3$ The amines are prepared by condensation of 2,2-dinitro-2-fluoroethanol with aliphatic amines under controlled pH conditions. For example, 2,2-dinitro-2-fluoroethanol can be condensed with ethylenediamine to give 1,1,8,8-tetranitro-1,8-difluoro-3,6-diazaoctane. This is represented by the following general reaction:

(1) $2FC(NO_2)_2CH_2OH + NH_2CH_2CH_2NH_2 \rightarrow$
$FC(NO_2)_2CH_2NHCH_2CH_2NHCH_2(NO_2)_2CF$ An additional example of the preparation of an amine of the invention results from the reaction of 2,2-dinitro-2-fluoroethanol with trifluoroethyl amine to obtain 1,1-difluoro-1,5,5,5-tetrafluoro-3-azapentane. This preparation is represented by the following chemical reaction:

(2) $FC(NO_2)_2CH_2OH + CF_3CH_2NH_2 \rightarrow$
$FC(NO_2)_2CH_2NHCH_2CF_3$

After the initial reactions with the 2,2-dinitro-2-fluoroethanol the resultant product of reactions 1 and 2 can be nitrated with a mixture of 99 percent nitric acid and 96 percent sulfuric acid in accord with reactions 3 and 4:

(3) (Product of 1) $\xrightarrow[H_2SO_4]{HNO_3}$ $RCH_2(NO_2)CH_2CH_2N(NO_2)CH_2R$ (4) (Product of 2) $\xrightarrow[H_2SO_4]{HNO_3}$ $RCH_2N(NO_2)CH_2CF_3$ The resultant nitrated products of reactions 3 and 4 are useful explosives containing the reactant group, $R=C(NO_2)_2F$. The pH for carrying out the reactions 1 and 2 was within the range of 4 to 8. As a matter of convenience, it is preferred to introduce the amines into the reaction mixture as salts. The free amine is then generated in situ by the addition of an equivalent amount of base. Reactions 1 and 2 were carried out at ambient pressures and temperatures with the resulting products generally extracted using a suitable solvent. The nitration reactions 3 and 4 producing the final nitramine products contemplated are generally carried out at a nitration temperature of 0–10° C. After the addition of the nitric acid, the mixture may be heated up to 50° C. for a time sufficient for reaction completion which is generally about one hour. The mixture can be then cooled with the resultant product obtained as white solids when the mixture is poured over ice.

ESTERS

A series of organic esters incorporating the fluorodinitromethyl grouping are contemplated within the scope of this invention. The esters are prepared by reacting the aforementioned 2,2-dinitro-2-fluoroethanol with esters of aromatic acid chlorides and in one instance the heterocyclic compound cyanuric chloride.

The 2,2-dinitro-2-fluoroethanol can be reacted with aromatic acid chlorides in accord with the following reactions using a conventional Lewis acid catalyst such as aluminum chloride:

5(a) ClOC—⟨benzene ring with COCl groups⟩—COCl + $4HOCH_2C(NO_2)_2F \xrightarrow{AlCl_3}$ $F(NO_2)_2CH_2CO_2C$—⟨benzene ring⟩—$CO_2CH_2C(NO_2)_2F$
$F(NO_2)_2CH_2CO_2C$—⟨benzene ring⟩—$CO_2CH_2C(NO_2)_2F$

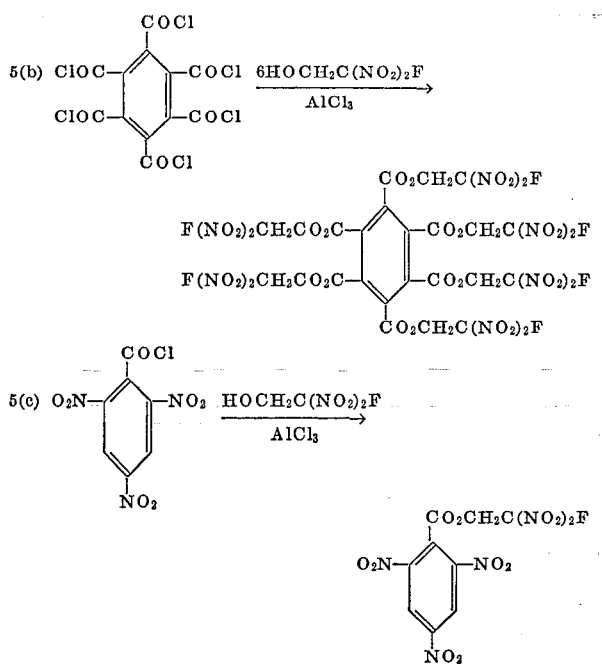

In the heterocyclic series, the reaction of the chloride of cyanuric acid is indicated by the following reaction:

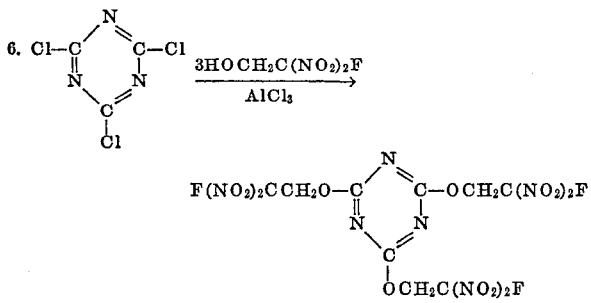

The reactants in reactions 5 and 6 above are generally heated to a reflux temperature and refluxed for several hours until the evolution of HCl ceases. For convenience the reaction is usually conducted in the presence of an inert organic solvent such as ethylene dichloride or chloroform. A solid product is obtained which can then be separated and washed and finally purified by recrystallization. It is believed the invention will be better understood from the following detailed examples:

EXAMPLE I

A solution of 2.0 g. (0.05 mole) of sodium hydroxide in 10 ml. of water was added dropwise to a solution of 7.7 g. (0.05 mole) of 2,2-dinitro-2-fluoroethnol, 3.35 g. (0.025 mole) of ethylene diamine dihydrochloride, and 25 ml. of water. An oil separated. After the addition was complete, the mixture was stirred for an additional 30 minutes. The mixture was extracted with 3 × 20 ml. portions of methylene chloride. The combined methylene chloride extracts were washed several times with water, dried and concentrated in vacuo leaving 6.7 g. (87.7 percent) of amber oil.

One gram (0.003 mole) of 1,1,8,8 - tetranitro - 1,8-difluoro-3,6-diazaoctane was added at 0–10° C. to a solution of 5 ml. 99 percent nitric acid and 5 ml. of 96 percent sulfuric acid. The mixture was heated at 45–50° C. for one hour, cooled, and poured on ice. The white solid was collected, washed in water, and dried in vacuo over potassium hydroxide. The yield was 1.1 g. (86.7 percent), M.P. 145–148° C. Two recrystallizations from ethylene dichloride gave white needles, M.P. 147–148° C.

EXAMPLE II

A solution of 2.0 g. (0.05 mole) of sodium hydroxide in 10 ml. water was added dropwise to a solution of 7.7 g. (0.05 mole) of 2,2-dinitro-2-fluoroethanol, 6.8 g. (0.05 mole) of 2,2,2-trifluoroethylamine hydrochloride, and 25 ml. of water. An oil separated. After the addition was complete, the mixture was stirred for an additional 30 minutes. The mixture was extracted with 3 × 20 ml. portions of methylene chloride. The combined methylene chloride extracts were washed several times with water, dried and concentrated in vacuo leaving 6.7 g. (57.0 percent) of yellow liquid.

A mixture of 90 ml. of 99 percent nitric acid and 90 ml. of 96 percent sulfuric acid was cooled to 0–10° C. 1,1 - dinitro - 1,5,5,5 - tetrafluoro - 3 - azapentane, 35.75 g. (0.152 mole) was added dropwise keeping the temperature at 5° C. by external cooling. After the addition was complete, the solution was allowed to warm to ambient temperature and stirred an additional hour. The acid solution was then poured on ice. The white solid, which precipitated, was collected, washed with water and dried in vacuo over potassium hydroxide. The yield of product was 12.0 g. (28 percent), M.P. 59–60° C. Recrystallization from chloroform raised the melting point to 60–61° C.

EXAMPLE III

A mixture of 25.7 g. (0.1 mole) of 2,4,6-trinitrobenzoic acid, 36 g. (0.3 mole) of thionyl chloride was refluxed for three days, cooled and concentrated in vacuo to give a quantitative yield of 2,4,6-trinitrobenzoyl chloride, M.P. 158–159.5° C.

A mixture of 2.75 g. (0.01 mole) of 2,4,6-trinitrobenzoyl chloride, 1.54 g. (0.01 mole) of 2,2-dinitro-2-difluoroethanol, 0.13 g. (0.001 mole) of anhydrous aluminum chloride and 10 ml. of ethylene dichloride was refluxed overnight. The mixture was cooled, filtered, and the filtrate washed with 4 percent HCl, water, dried and concentrated in vacuo leaving 2.8 g. (71.3) percent) of solid, M.P. 101–103° C. Recrystallization from isopropyl alcohol raised the melting point to 107–108° C.

EXAMPLE IV

A mixture of 10 g. (0.039 mole) of pyromellitic acid, 70 ml. of 1,2,4-trichlorobenzene, and 3.3 g. of phosphorous pentachloride was heated to 130° C. for 3 hours. The reaction mixture was cooled and filtered to remove a small amount of insoluble material. The filtrate was concentrated in vacuo leaving 8.7 g. (67.3 percent) of crude brown solid.

A solution of 0.82 g. (0.0025 mole) of pyromellitoyl chloride in 5 ml. of chlorobenzene was added dropwise at 0° C. to a solution of 1.85 g. (0.012 mole) of 2,2-dinitro-2-fluoroethanol, 0.79 g. (0.010 mole) of pyridine, and 5 ml. of chlorobenzene. A yellow viscous oil separated. The reaction mixture was heated to reflux for 50 minutes. On cooling a solid product separated. The solid was separated and dissolved in ethyl acetate. The solution was washed with 4 percent HCl, 5 percent NaHCO₃, and water, dried and concentrated to yield 0.86 g. (43.0 percent) of amber colored solid. Several recrystallizations from ethylene dichloride gave colorless crystals, M.P. 163.5–165° C.

EXAMPLE V

A solution of 0.92 g. (0.005 mole) of cyanuric chloride in 5 ml. of methylene chloride was added at 0° C. to a solution of 2.54 g. (0.0165 mole) of 2,2-dinitro-2-fluoroethanol, 1.5 g. (0.0165 mole) of pyridine and 15 ml. of methylene chloride. The reaction mixture was refluxed overnight, cooled, filtered, and the filtrate washed with 4 percent HCl and water. The methylene chloride solution was dried and concentrated in vacuo giving 1.4 g. (38.0 percent) of viscous yellow oil. The oil was redissolved in methylene chloride and treated with charcoal. Concentration gave a colorless solid, M.P. 65–70° C. Recrystallization from chloroform raised the melting point to 76–77° C.

TABLE I.—NEW EXPLOSIVES

| Compound | Calculated explosive power (TNT=100) | M.P., °C. | Formula | Calculated C | Calculated H | Calculated F | Calculated N | Found C | Found H | Found F | Found N |
|---|---|---|---|---|---|---|---|---|---|---|---|
| FC(NO$_2$)$_2$CH$_2$N(NO$_2$)CH$_2$CH$_2$N(NO$_2$)CH$_2$C(NO$_2$)$_2$F | 132 | 147–148 | C$_6$H$_8$F$_2$N$_8$O$_{12}$ | 17.07 | 1.91 | 9.00 | | 17.31 | 2.19 | 8.92 | |
| FC(NO$_2$)$_2$CH$_2$N(NO$_2$)CH$_2$CF$_3$ | 140 | 60–61 | C$_4$H$_4$F$_4$N$_4$O$_6$ | 17.15 | 1.43 | 27.17 | 20.00 | 17.12 | 1.60 | 26.32 | 20.07 |
| 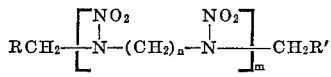 | 123 | 107–108 | C$_9$H$_4$FN$_5$O$_{12}$ | 27.49 | 1.02 | 4.83 | 17.81 | 27.42 | 1.12 | 4.55 | 17.91 |
| 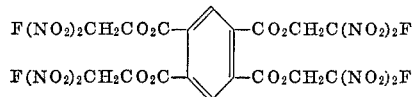 | 105 | 163.5–165 | C$_{18}$H$_{10}$F$_4$N$_8$O$_{24}$ | 27.10 | 1.25 | 9.52 | 14.00 | 27.39 | 1.84 | 8.72 | 12.70 |
| 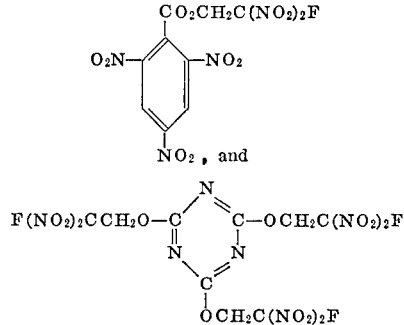 | 146 | 76–77 | C$_9$H$_6$F$_3$N$_9$O$_{15}$ | 20.12 | 1.12 | 10.61 | 23.47 | 20.12 | 1.20 | 9.90 | 22.88 |

Although the invention has been described and illustrated in detail, it is to be clearly understood that the same is by way of illustration and example only and is not to be taken by way of limitation, the spirit and scope of this invention being limited only by the terms of the appended claim.

I claim:

1. Explosive compounds selected from the class consisting of $$RCH_2 \left[ \begin{array}{c} NO_2 \\ N-(CH_2)_n-N \end{array} \begin{array}{c} NO_2 \\ \end{array} \right]_m CH_2R'$$

where
  $n = 1$ to $3$
  $m = 0$ to $3$
  $R = -C(NO_2)_2F$
  $R' = -C(NO_2)_2F$, and when $m=0$ is $-CF_3$,

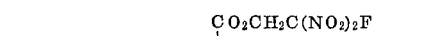
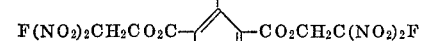
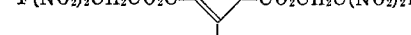

and

References Cited
UNITED STATES PATENTS

| | | | |
|---|---|---|---|
| 3,000,955 | 9/1961 | Frankel | 260—583 |
| 3,073,705 | 1/1963 | Park et al. | 260—644 |
| 3,118,004 | 1/1964 | Hauptschein et al. | 260—644 |
| 3,203,999 | 8/1965 | Gardner et al. | 149—88 |

LELAND A. SEBASTIAN, Primary Examiner

U.S. Cl. X.R.

149—88, 92; 260—248, 471, 475, 583, 644